United States Patent
Glynn (10) Patent No.: US 7,808,121 B1
(45) Date of Patent: Oct. 5, 2010

(54) VEHICLE WITH ELECTRICITY GENERATING, BRAKING WIND TURBINE

(75) Inventor: Kenneth P. Glynn, Flemington, NJ (US)

(73) Assignee: Kenergy Development Corp., Flemington, NJ (US)

( * ) Notice: Subject to any disclaimer, the term of this patent is extended or adjusted under 35 U.S.C. 154(b) by 0 days.

(21) Appl. No.: 12/584,267

(22) Filed: Sep. 2, 2009

(51) Int. Cl.
*F03D 9/02* (2006.01)

(52) U.S. Cl. .......................... 290/55; 290/54; 290/1 R; 415/2.1

(58) Field of Classification Search .................... 290/55, 290/54; 180/2.2
See application file for complete search history.

(56) References Cited

U.S. PATENT DOCUMENTS

| | | | |
|---|---|---|---|
| 3,556,239 A | | 1/1971 | Spahn |
| 3,876,925 A | | 4/1975 | Stoeckert |
| 4,168,759 A | | 9/1979 | Hull et al. |
| 5,038,049 A | | 8/1991 | Kato |
| 5,272,378 A | * | 12/1993 | Wither .................. 290/1 R |
| 6,409,467 B1 | * | 6/2002 | Gutterman ............... 415/4.3 |
| 6,838,782 B2 | | 1/2005 | Vu |
| 6,897,575 B1 | | 5/2005 | Yu |
| 6,926,346 B1 | | 8/2005 | Wong et al. |
| 7,347,485 B1 | | 3/2008 | Saunders |
| 7,665,554 B1 | * | 2/2010 | Walsh .................... 180/2.2 |
| 2003/0132638 A1 | | 7/2003 | Simonsen |
| 2003/0231000 A1 | | 12/2003 | Teo |
| 2007/0189899 A1 | | 8/2007 | Serpa |
| 2008/0283319 A1 | | 11/2008 | Putnam |

* cited by examiner

*Primary Examiner*—T C Patel
*Assistant Examiner*—Iraj A Mohandesi
(74) *Attorney, Agent, or Firm*—Kenneth P. Glynn, Esq.

(57) ABSTRACT

An energy efficient land vehicle includes a.) a conventional land power mechanism, with a storage battery and power consuming mechanisms directly or indirectly connected to the storage battery, for controlled delivery of electric power to the power consuming mechanisms; b.) a supplemental electric power generation system located on the conventional land vehicle, the supplemental power plant including: i.) a housing; ii.) at least one set of rotatable blades mounted within the housing; iii.) a movable shaft connected to the set of rotatable blades; iv.) a generator for generating electricity connected to the shaft; v.) a voltage regulator; and, vi.) a connection to the storage battery for providing electric power. The housing has at least an open front for air ingress and an open area downstream from the blades for air egress, and the open front has at least one gate. The gate opens only when the vehicle is decelerating or stationary and is otherwise closed during vehicle movement.

20 Claims, 8 Drawing Sheets

1 — Vehicle Power Means
- Electric Vehicle Engine
- Fuel Cell System
- Internal Combustion Engine
- Hybrid systems

3 — Housing Configurations
- Integrated into vehicle and located on roof, hood, or sides
- Retrofitted into vehicle and located on roof
- Fixed or removable housing
- Open sides for wind exposure when parked
- Collapsible sides for wind exposure when parked

5 — Gate Options
- Pressure controls (e.g. Pitot Tube)
- Motion controls (e.g. accelerometer)
- System integrated controls (e.g. linked to gas pedal)
- Louvered gate
- Single gate

7 — Blade Configurations
- Horizontal blade horizontal axis turbine
- Horizontal blade vertical axis turbine
- Vertical blade horizontal axis turbine
- Savonius vertical axis turbine
- Darrieus vertical axis turbine
- Fixed or variable orientation to maximize wind exposure

9 — Generator Options
- Shaft driven
- Belt driven
- Peripheral power generation
- Gear driven
- Gearless

VEHICLE WITH ELECTRICITY GENERATING, BRAKING WIND TURBINE

BACKGROUND OF INVENTION a. Field of Invention

The invention relates generally to a vehicle mounted device for generating electrical energy from wind experienced during periods of deceleration and rest. The device makes use of a combination of an aerodynamic housing, motion sensitive gate means, wind turbines, generators, and power storage units to translate the kinetic energy of the wind into electrical energy. In addition to generating electricity, the added resistance of the system when the gate means is open during deceleration supplements the braking power of the vehicle.

b. Description of Related Art

The following patents are representative of the field pertaining to the present invention:

U.S. Pat. No. 2008/0283319 A1 to Putnam describes a self-generated wind due to the forward progress of a vehicle is captured in an air flow chamber housing a wind energy system which has a horizontal wind turbine with multiple blades moving in a clockwise direction. The air flow chamber is positioned in an optimal manner to harness the air flow and is essential to producing ecologically desirable wind energy by using a generator to send an AC electric current to be stored in the battery of an electric or hybrid vehicle in order to extend its travel distance.

U.S. Pat. No. 2007/0189899 A1 to Serpa describes a wind turbine rotor, the rotor blades of which are shaped generally to resemble the sail of an Oceanic sprit rig sailboat (a traditional sailing craft with a sail plan having unusual and significant aerodynamic properties). The rotor blades might be movably mounted to maximize use of apparent wind. An alternative embodiment includes a contra-rotating rotor of similar design.

U.S. Pat. No. 2003/0231000 A1 to Teo describes a battery charger for an electric vehicle that is provided. The battery charger includes an air scoop to receive a flow of air. A turbine then receives the flow of air from the air scoop during vehicular operation. The flow of air causes the turbine to rotate. A generator coupled to the turbine generates electricity when the turbine rotates. The electricity generated by the generator charges a battery coupled to the generator.

U.S. Pat. No. 2003/0132638 A1 to Simonsen describes the use of turbines turned by the wind that passes an automobile when it is running to electricity. This then runs the electric motor. This eliminates the combustion engine. Thus making it so that you never need to stop and get gasoline.

U.S. Pat. No. 7,347,485 B1 to Saunders describes a wind deflector assembly attachable to the exterior, front or side surface of a vehicle windshield or body, adaptable to be connected to differently shaped and contoured windshields and bodywork, tunable to obtain the desired wind deflection effect and, in some embodiments, removable and reattachable to the vehicle windshield or other aerodynamically desirable locations on the vehicle body. The exterior surface mounted adjustable wind deflector of the present invention comprises a transparent, flexible shield along with two integrated mounting assemblies in the preferred embodiment. The mounting assemblies employ a clamshell type connector adapted for adhesive attachment to the exterior front surface of a windshield without having to drill or otherwise alter the windshield. In other embodiments, the mounting assemblies may utilize a simple non-clamshell adhesive connector, a hook-and-loop connector, a magnetic connector, or similar connection methods to attach the wind deflector to an aerodynamically desirable location on the vehicle windshield or body. The mounting assemblies each comprise a peripherally-toothed post that is integrated into of one the leaves of the clamshell connector. The post is threadedly mated to one end of a stem extending along the central longitudinal axis of the post. The other end of the stem is threadedly mated to a ball. A platform connector element carries as a part thereof a jaw-forming socket sized to receive that ball and squeeze it so as to maintain an adjusted position when the jaws of the socket are tightened down thereagainst. The platform connector element further includes means to attach the shield to the mounting assemblies using screws and adhesive tape.

U.S. Pat. No. 6,926,346 B1 to Wong et al. describes an adjustable vehicular airflow control device (10 and 100). The control device includes a deflector panel (12 and 112) adapted to be disposed on a front section (14) of a vehicle to selectively control airflow about the front section of the vehicle. The control device further includes an actuator assembly (28 and 128) coupled to the deflector panel for linearly moving the deflector panel, such as in vertical direction and/or a fore and aft direction, and rotating the deflector panel. Preferably, the deflector panel is adjustable while the vehicle is moving. A method of controlling a position of a deflector panel disposed on a front section of a vehicle. The method includes sensing a speed of the vehicle and automatically adjusting a position of the deflector panel relative to the vehicle based upon the sensed speed of the vehicle.

U.S. Pat. No. 6,897,575 B1 to Yu describes a device for converting wind energy into electrical energy for powering a vehicle, the device including a wind turbine positioned on the vehicle and a generator positioned within the vehicle and connected between the wind turbine and systems of the vehicle. When the vehicle is in motion, wind impinges on the wind turbine and causes the wind turbine to rotate. The generator converts rotational energy of the wind turbine into electrical energy. The electrical energy is provided to power the systems of the vehicle and batteries of the vehicle are recharged.

U.S. Pat. No. 6,838,782 B2 to Vu describes a wind energy capturing device for moving vehicles including a wind turbine powered electrical power generator for installation on the roof of a moving vehicle such as a truck cab or tractor. The invention takes advantage of the powerful wind force generated by the vehicle moving on the road at moderate to high speed impinging against the wind deflector mounted on the truck cab or tractor. This otherwise "wasted" wind energy is captured and directed to the face area of the rotor blade, rotating the turbine, which, in turn, drives the generator to generate electricity. The electrical energy may be stored in a battery system and used to drive the motors of an electric vehicle or hybrid-electric vehicle.

U.S. Pat. No. 5,038,049 to Kato describes an apparatus for generating electric power from wind including a base, a pair of upstanding, generally parallel, spaced apart walls rotatably mounted on the base and defining an inlet end and an outlet end for wind, an electric power generator mounted on the base and having an input shaft, and a vertical axis cylindrical rotor having a plurality of wind driven vanes and mounted on the base between the walls, and having an output shaft coupled to rotate the input shafts. A curved inner modulator is rotatably mounted on the base inside said rotor and is selectively movable for controlling wind flow through the rotor. An inlet modulator is rotatably mounted on the base at the inlet end and is selectively movable for controlling wind flow to the rotor. A first generally planar director is pivotally mounted on an outer surface of one of the walls and a second generally planar director is pivotally mounted on an inner surface of the other one of the walls and both directors are responsive to the wind for positioning the inlet end toward the wind.

U.S. Pat. No. 4,168,759 to Hull, deceased et al. describes an automobile including a body provided with a passenger compartment and a uniquely shaped front end section whereby the forward motion of the automobile will result in a highly effective channeling of oncoming air to the roof of the passenger compartment. An opening is provided at the forefront of the roof contiguous with the downstream end of the front air scoop, and communicating with a chamber arranged above the passenger compartment of the automobile. The chamber includes a rear exit vent. Within the chamber there is an angularly oriented impeller positioned in the direct path of the air forced through the chamber by the front air scoop whereby the impeller is driven by the forced air. The impeller is connected by a suitable mechanical coupling to a generator to provide auxiliary power for the automobile.

U.S. Pat. No. 3,876,925 to Stoeckert describes a wind turbine driven generator for the recharging of batteries utilized as the power source for various vehicles, and particularly an automotive electrically driven vehicle, the mechanical combination wherein wind driven vanes of particular design are mounted to rotate about a vertical shaft disposed in or on the roof of the vehicle, said vanes being completely enclosed within a suitable housing of either rectangular or circular configuration. When of rectangular shape the housing has at least four air current receiving openings, one on each side, each of which do in turn serve as exhaust outlets depending on direction of predominant air pressure, and, when of circular configuration, the housing has but one air current receiving vent, with that vent revolving to face the direction of any wind current by the impetus of a wind vane on the top thereof. In either case, the arrangement is such that the said wind driven vanes rotate while the vehicle is under way, or if air currents are prevalent, even while the vehicle is not in motion, thus to drive a suitably mounted generator for more or less continuous recharge of the battery system. Said generator is mounted within the hub around which said vanes rotate, and comprises a stationary stator, and rotating rotor, the latter being wind driven by the rotating vanes.

U.S. Pat. No. 3,556,239 to Spahn describes a battery powered automobile that includes an air operated turbine fed by front and side air scoops for providing both charging current to the batteries and driving power for the automobile. An auxiliary internal combustion engine is included for use when necessary. Deceleration and wind sensitive controls operate door structure on the front air scoop so that is opens, increasing drag, only under predetermined conditions. Braking energy is utilized to help charge the batteries.

Notwithstanding the prior art, the present invention is neither taught nor rendered obvious thereby.

SUMMARY OF INVENTION

The present invention is an energy efficient land vehicle. It includes: a.) a conventional land vehicle having land power means, and having at least one storage battery and at least one power consuming mechanism directly or indirectly connected to the storage battery, for controlled delivery of electric power to the power consuming mechanisms; and, b.) a supplemental electric power generation system located on the conventional land vehicle, the supplemental power plant including: i.) a housing; ii.) at least one set of rotatable blades mounted within the housing; iii.) a movable shaft connected to the set of rotatable blades; iv.) a generator for generating electricity connected to the shaft; v.) a voltage regulator; and, vi.) a connection to the storage battery for providing electric power thereto; wherein the housing has at least an open front for air ingress and an open area downstream from the blades for air egress, and the open front has at least one gate, the gate having an open position allowing air to drive the set of rotatable blades, and having a closed position preventing air to drive the set of blades, and gate control means adapted to maintain the gate in the open position when the vehicle is at rest and when the vehicle is moving during deceleration, and adapted to maintain the gate closed when the vehicle is moving at a fixed speed and when the vehicle is moving during acceleration; such that when the vehicle is decelerating and the gate is open, the rotatable blades are moved by wind speed created by movement of the land vehicle, the shaft rapidly rotated causing the generator to impart electricity through the voltage regulator, to the storage battery, whereby the power consuming mechanism is indirectly powered by the generator so that electrical load on the storage battery is reduced.

The energy efficient land vehicle may be powered by an internal combustion engine, electric engine, or hybrid engine power means. The present invention may be integrated into the energy efficient land vehicle by the vehicle manufacturer or may be added after purchase as a retrofit.

Further, in some preferred embodiments of the present invention, the housing may be integrated as a seamless piece or as a distinct feature. The housing may be permanently fixed to the energy efficient land vehicle through a retrofit or may be removable to facilitate maintenance needs. In some preferred embodiments of the present invention, the housing may be mounted on the roof, hood, side, fender, or any combination there of on the vehicle.

In some preferred embodiments of the present invention, the housing has a gated inlet opening and an exhaust opening downstream of the inlet. The term "gate" should be taken broadly as any device that can open and close an area to significant wind. In some preferred embodiments of the present invention, louvers or folding gates may be used. The two openings allow wind to pass through the housing.

In some preferred embodiments of the present invention, the gate will be controlled by a gate control mechanism that measure vehicle motion based on criteria selected from the group consisting of accelerometer changes, tachometer changes, gas pedal change, brake pedal change, and engine control unit change.

In some preferred embodiments of the present invention, the housing may have open or openable sections on the sides. In the embodiment of the present invention with open or openable sides, the vehicle may be exposed to natural wind while parked to power the present invention.

In some preferred embodiments of the present invention, wind turbines selected from the group consisting of vertical axis-vertical blade wind turbines, horizontal axis wind turbines, Savonius wind turbines, Darrieus (eggbeater) wind turbines, and vertical axis-horizontal blade wind turbines are located within the housing. The wind turbines are positioned such that they are driven by wind entering the housing. In some preferred embodiments of the present invention, the wind turbines will be stationary in their orientation, while in others they may be equipped with vanes to track wind direction.

In some other preferred embodiments of the present invention, which may include any of the features set forth above, an energy efficient land vehicle includes: a.) a conventional land vehicle having land power means, and having at least one storage battery and at least one power consuming mechanism directly or indirectly connected to the at least one storage battery, for controlled delivery of electric power to the at least one power consuming mechanism; and, b.) a supplemental electric power generation system located on the conventional land vehicle, the supplemental power plant including: i.) a housing seamlessly integrated with the land vehicle; ii.) at least one set of rotatable blades mounted within the housing; iii.) a movable shaft connected to the set of rotatable blades; iv.) a generator for generating electricity connected to the shaft; v.) a voltage regulator; and, vi.) a connection to the storage battery for providing electric power thereto; wherein the housing has at least an open front for air ingress and an open area downstream from the blades for air egress, and the open front has at least one gate, the gate having an open position allowing air to drive the set of rotatable blades, and having a closed position preventing air to drive the set of blades, and gate control means adapted to maintain the gate in the open position when the vehicle is at rest and when the vehicle is moving during deceleration, and adapted to maintain the at least one gate closed when the vehicle is moving at a fixed speed and when the vehicle is moving during acceleration; such that when the vehicle is decelerating and the at least one gate is open, the rotatable blades are moved by wind speed created by movement of the land vehicle, the shaft rapidly rotated causing the generator to impart electricity through the voltage regulator, to the storage battery, whereby the power consuming mechanism is indirectly powered by the generator so that electrical load on the storage battery is reduced.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE EMBODIMENTS

Figure 1:
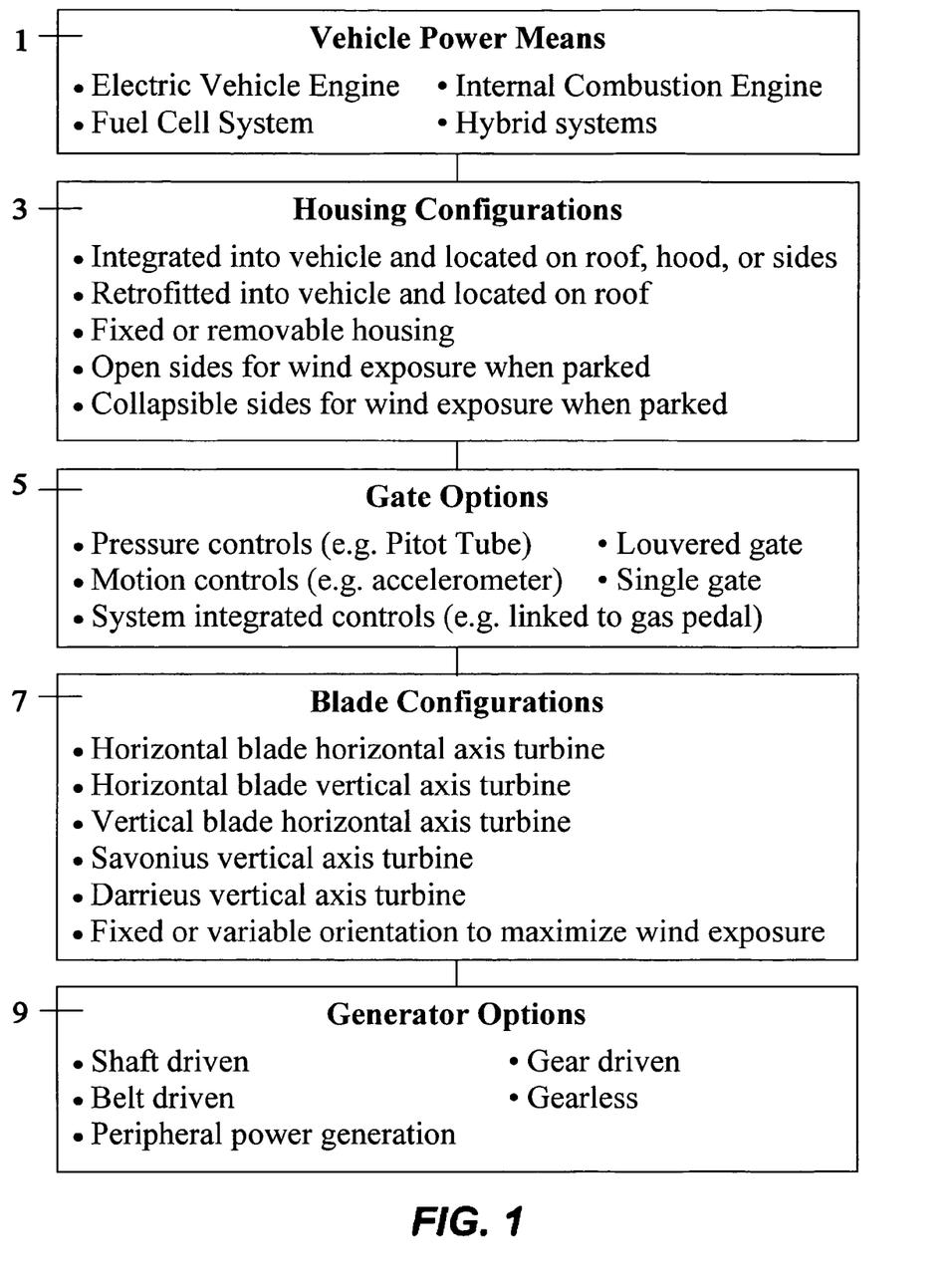
FIG. 1 is a diagrammatic presentation displaying the key components of the present invention and various configurations for each component.

The present invention is adapted to be used with vehicles driven by any number of power plants. Referring now to FIG. 1, Vehicle Power Means block 1 outlines a number of possible options for vehicle power plants. The vehicle power means 1 is the primary driving force for the vehicle, delivering the necessary power to propel the vehicle during normal operation. This motion will create wind required to operate the electricity generating, brake assisting wind turbine described. When the vehicle is stationary, nature's wind, when it is available, will provide additional electrical generation in accordance with the present invention.

The first power means 1 that this invention pertains to is the internal combustion engine. The most popular power means on the road today, the internal combustion engine makes use of combustible fuel to drive the vehicle. In addition to propelling the vehicle, the motion of the engine is used to drive an alternator, which charges the vehicle's batteries. These batteries are then used to power the vehicle's drive and accessory systems. Internal combustion powered vehicles suffer from a dependency on limited fuel resources and produce environmentally detrimental exhaust during normal operation. The present invention is adapted to internal combustion engines to supply additional electricity for recharging the vehicle's battery, which reduces the load on the vehicle's alternator. Use of the present invention may permit the alternator to be used less, thereby allowing more engine power to be used in propelling the vehicle. The present invention also permits generated electricity to be stored in auxiliary batteries used to power ancillary vehicle systems and accessories. By reducing the electrical drain on the vehicle, the present invention improves the efficiency of vehicles with internal combustion engines and lessens the negative effects commonly associated with them.

As an alternative to traditional internal combustion engines, a growing number of vehicles are currently available with pure electric power means. The electrical energy required to power electric vehicle engines is stored in batteries carried within the vehicle. Advancing battery technology is aiming to decrease the weight of these batteries while increasing storage capacity, but the range for purely electric vehicles is still quite limited when compared to that of internal combustion powered vehicles. Pure electric vehicles traditionally require a connection to the power grid to recharge their batteries after use, which further limits the appeal of these vehicles as it is difficult to recharge should the battery be drained while on the road. The present invention includes a means to supply additional electrical charge to the vehicle's batteries, increasing the effective range of the vehicle. When the present invention is configured with open or removable sides and vertical axis or self-orienting horizontal axis wind turbines, the present invention permits recharging of the vehicle's batteries while the vehicle is parked and adequate wind is available. Depending on local weather conditions, this can reduce or eliminate the vehicle's dependency on grid power.

One relatively recent area of research for vehicle power means is the advancement of fuel cell technology. Fuel cells are electrochemical conversion devices that take advantage of the chemical reaction between an oxidant and fuel supply to produce electrical energy. This energy is then stored in a battery to be used in an electric engine powered vehicle. The hydrogen fuel cell is receiving the most attention due to the ready availability of its fuel and benign nature of resulting byproducts during use. However, an acceptable hydrogen based infrastructure has yet to be developed, posing a major hindrance to the widespread acceptance of this power means. The present invention can produce additional electrical energy to extend the range of hydrogen vehicles and aid in powering accessory vehicle systems.

It should be understood that a combination of two or more of these vehicle power means may be used in tandem as a hybrid system. Hybrid systems aim to lessen the negative characteristics of a given power means by coupling it with another means. In the example of an internal combustion and electric hybrid, the internal combustion engine may be used to recharge the batteries of the electric engine or may selectively run during certain operating conditions to lessen the load on the batteries. Both of these methods have the effect of increasing the range of the electrical vehicle while simultaneously decreasing emissions when compared to a comparable internal combustion vehicle. The present invention provides a means to supply additional electrical energy to the hybrid vehicle's batteries, reducing the load on the power means and extending the range of the vehicle. In any configuration of engine power means, providing additional electrical energy to the storage battery will serve to increase vehicle efficiency and range.

The wind turbine (referred to herein as the blades, shaft, and generator) will be contained within a housing designed to protect the system from damage and the elements. A list of Housing Configurations 3 is presented in FIG. 1. All possible configurations fit into one of two categories for the housing: integrated into the vehicle from the manufacturer or retrofitted to the vehicle after purchase.

If the present invention electricity producing, braking wind turbine is to be installed into the vehicle by the manufacturer, there are a number of variations possible. The housing may be located on the roof of the vehicle, either covering the entire surface or as a smaller scoop. Similarly, the housing may be located on the hood of the vehicle and cover the entire surface area of the hood or reside within a scoop on the hood. It is also possible that the wind turbine be placed within the vehicle and fed air through scoops on the exterior of the vehicle.

Retrofitting the present invention onto a vehicle without extensive modification limits the number of options for mounting. The best option for a retrofit is to fit the housing to the roof of the vehicle. This method presents the least interference with existing vehicle components while providing enough space to receive useable wind As an aftermarket retrofit, it is possible for the housing to be either permanently fixed to the vehicle or attached as a removable accessory to allow easier access for maintenance.

In either configuration wherein the present invention is integrated in the vehicle by the manufacturer or retrofitted to the vehicle after purchase, the housing may include fixed (permanently closed) sides, collapsible (openable) sides, or open sides. The issue of facing the vehicle into prevailing winds when at rest is addressed by allowing for the side of the housing to be open while the vehicle is stationary or parked. To take advantage of open sides on the housing, self orienting horizontal axis wind turbines or vertical axis wind turbines must be mounted within the housing. Including wind seeking vanes on a horizontal axis wind turbine allows the wind turbine to track incoming winds without the need for additional control systems. Vertical axis wind turbines have the advantage of functioning no matter their orientation to incoming winds, so long as the wind is largely perpendicular to the wind turbine. With either of these blade options installed in a housing with open or openable sides, the present invention permits power generation while parked so long as there is adequate natural wind, regardless of direction.

The next critical component of the electricity generating and wind braking vehicle are the Gate Options 5 incorporated into the housing. The Gate Options 5 consists of a variable position gate and reactive control means. The gate itself may be a single piece that tilts, raises, or folds based on vehicle motion to allow or prevent incoming wind from entering the housing. It should be understood that a plurality of gates may be used to perform this task, such as in a louvered array.

The reactive control means will determine the position of the gate based on the motion of the vehicle, with the gates only being opened during deceleration or when the vehicle is at rest. In order to accurately control the gate position, a control means will need to detect the speed and acceleration of the vehicle. Three possible sensor groups are outlined under Gate Options 5 in FIG. 1. A pressure sensitive control device such as a Pitot tube could be used to measure the pressure experienced from incoming wind and thereby determine the speed of the vehicle. Motion based controlling sensors such as accelerometers can detect the actual acceleration of the vehicle and adjust gate position accordingly. Both of these sensor options would require an intermediate circuit to analyze and translate acquired data into appropriate gate positions. A third option would be a direct control method integrated into the standard vehicle controls. For example, a linkage between the gas pedal, brake pedal, engine control unit, and gate could be created such that the gate is closed once the gad pedal is pressed and remains closed until the brake is applied. Once the brake is applied the gate will remain open until the gas pedal is pressed. When car is off the engine control unit will be off, and the gate control means can open the gate to take advantage of natural wind. In this way, the comparative circuit required by the motion and pressure sensors to determine acceleration and deceleration is eliminated, simplifying the system.

With the gate system open, wind will be directed into the housing to impart motion to a wind turbine blade housed within. The wind turbine may take a number of forms, as listed under Blade Configurations 7 of FIG. 1. It is to be understood that the present invention may make use of a single turbine or a plurality of turbines so as to most efficiently translate wind into rotational motion and thereby electricity.

The first classification of wind turbine that could be mounted within the housing consists of vertical axis wind turbines, or VAWTs. VAWTs make use of blades arranged around a central vertically rotating shaft to translate wind speed into rotational motion. The blades may be arranged radially horizontal from the center shaft or may be oriented vertically parallel to the central shaft. Additional VAWT blade styles such as the Savonius or Darrieus blade systems may be used to further improve the effectiveness of the present invention. One main benefit of VAWTs is that they are omnidirectional, capable of functioning from incoming wind perpendicular to their axis of rotation regardless of direction.

A second class of wind turbines that may be placed within the housing are horizontal axis wind turbines, or HAWTs. HAWTs can be arranged similarly to VAWTs, with blades arranged radially vertical from the center shaft or oriented horizontally parallel to the central shaft. Unlike VAWTs, HAWTs require that incoming wind be parallel to their axis of rotation for optimal productivity. While HAWTs can be held stationary within the housing, it may be preferable to include orientation means to aim the turbines at incoming wind. This is commonly accomplished by including vanes on the turbines that allow rotation to face incoming wind streams.

Once the wind turbine rotor is driven by the wind, the rotational motion of the blades must be converted into electricity. This is accomplished by linking the turbine rotor to a generator. Various Generator Options 9 are listed in FIG. 1. The shaft of the wind turbine may be directly connected to a generator. This style of wind turbine is often called gearless due to the lack of intermediate gear boxes in its design. Care must be taken to match the blade speed to generator speed to ensure the turbine is not burdened with too much mechanical resistance to operate or so little resistance that the rotational speeds produced exceed the limits of the generator. To address this issue, gear driven generators make use of belt or gear drive trains to convert turbine blade speeds to the required generator speed. This requires additional space and increases the complexity of the system, resulting in increased maintenance needs. Because of these issues, it may be beneficial to use a gearless wind turbine with peripheral power generation. In such a system, the wind turbine blades have rotor magnets fixed to their tips and are surrounded by a cowling with complimentary stator components contained inside. The motion of the turbine blades within this cowling acts as a generator and allows useful electricity to be produced at lower wind speeds than traditional configurations. Peripheral power generating wind turbine systems are less complex mechanically than other generating systems and are therefore easier to maintain.

By selecting one option or configuration from each of the blocks listed in FIG. 1, the key features of the present invention electricity generating, brake assisting wind turbine system can be demonstrated. The result is a device that simultaneously produces usable electrical power for the vehicle while assisting in vehicle braking. While in motion with the gate system closed, the entire device is aerodynamically designed so as to not impart excess drag to the existing vehicle profile. While braking, the gate system is opened and the wind created by the forward motion of the vehicle drives the wind turbines and produces electricity. In addition, the wind resistance added by the wind turbines will aid in slowing the vehicle, improving vehicle safety. It is also possible to select options from the blocks in FIG. 1 to construct a configuration of the present configuration capable of producing electricity form natural wind while the vehicle is parked.

Figure 2:
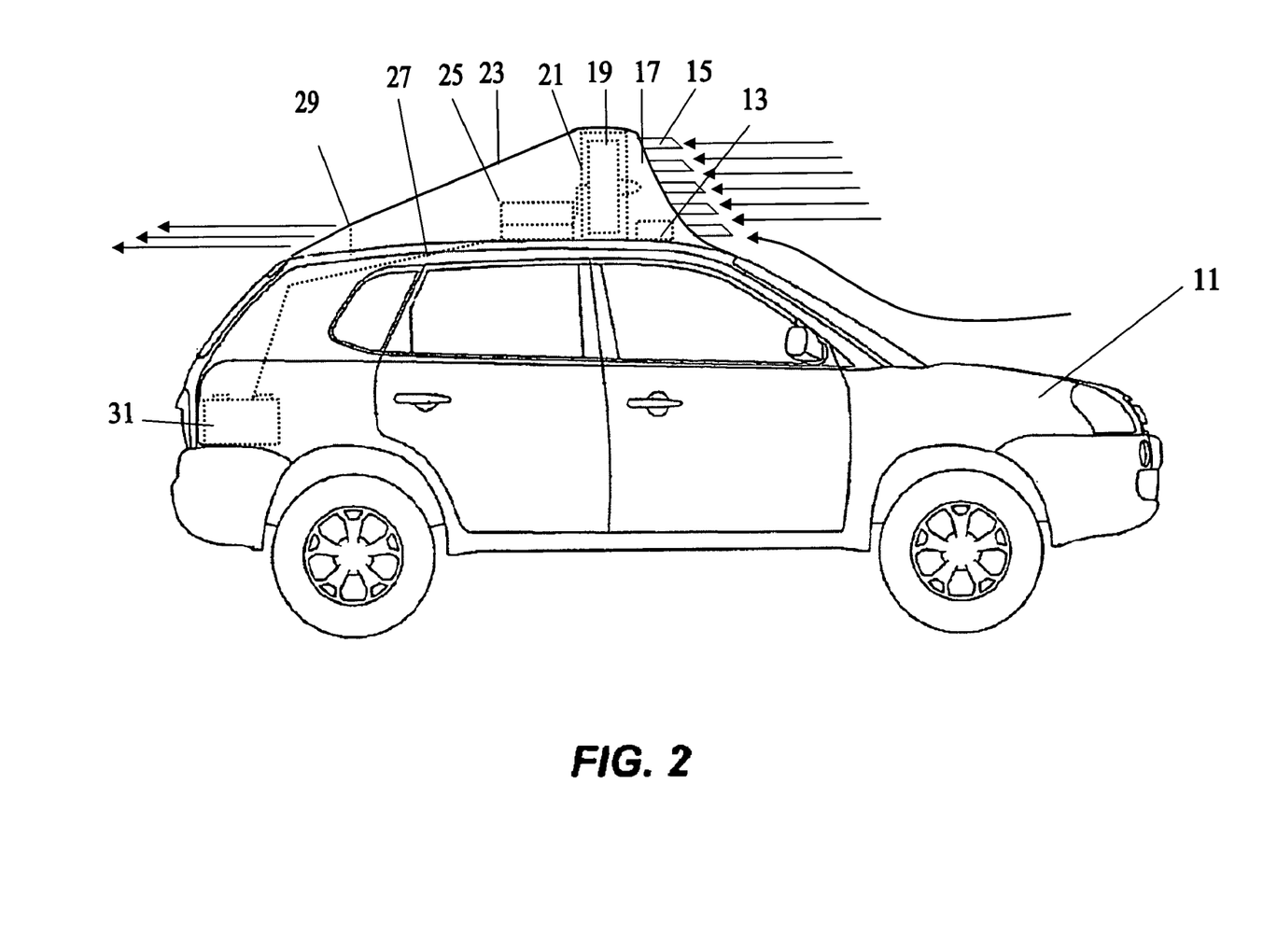
FIG. 2 is a side view of one configuration of the present invention, including a louvered gate means, an aerodynamic housing with inlet and exhaust openings, and stationary horizontal axis wind turbines.

FIG. 2 provides a left side view of the described invention on a small passenger vehicle 11. The aerodynamic housing 23 is located on the roof of vehicle 11 and has air inlet 17 located at the front of the housing 23 and air egress 29 at the rear of the housing 23. Air inlet 17 is notably larger than egress 29 to take advantage of increased wind speeds created by the Venturi Effect. While the vehicle 11 is decelerating or stopped, gate control means 13 opens the louvered gate 15 to allow wind into the housing 23. Gate control means 13 may make use of accelerometers, tachometers, a connection to the gas or brake pedal, or integration with the engine control unit to detect periods of deceleration or when vehicle 11 is stationary. With gate 15 open, wind strikes stationary horizontal axis wind turbine 19, which is supported by a structural frame 21 within housing 23. It should be understood that although a horizontal axis wind turbine is depicted in FIG. 2, any horizontal or vertical axis wind turbine design may be used, such as vertical axis vertical blade, vertical axis horizontal blade, vertical axis Darrieus blade, or vertical axis Savonius blade wind turbines. The rotational motion of the wind turbine 19 driven by incoming wind is transferred to generator 25, where is it used to produce electricity. This electricity then runs through a wiring harness 27 to the vehicle's storage battery 31. Vehicle storage battery 31 may be the primary battery of vehicle 11 or an auxiliary battery system used to power accessory systems.

Figure 3:
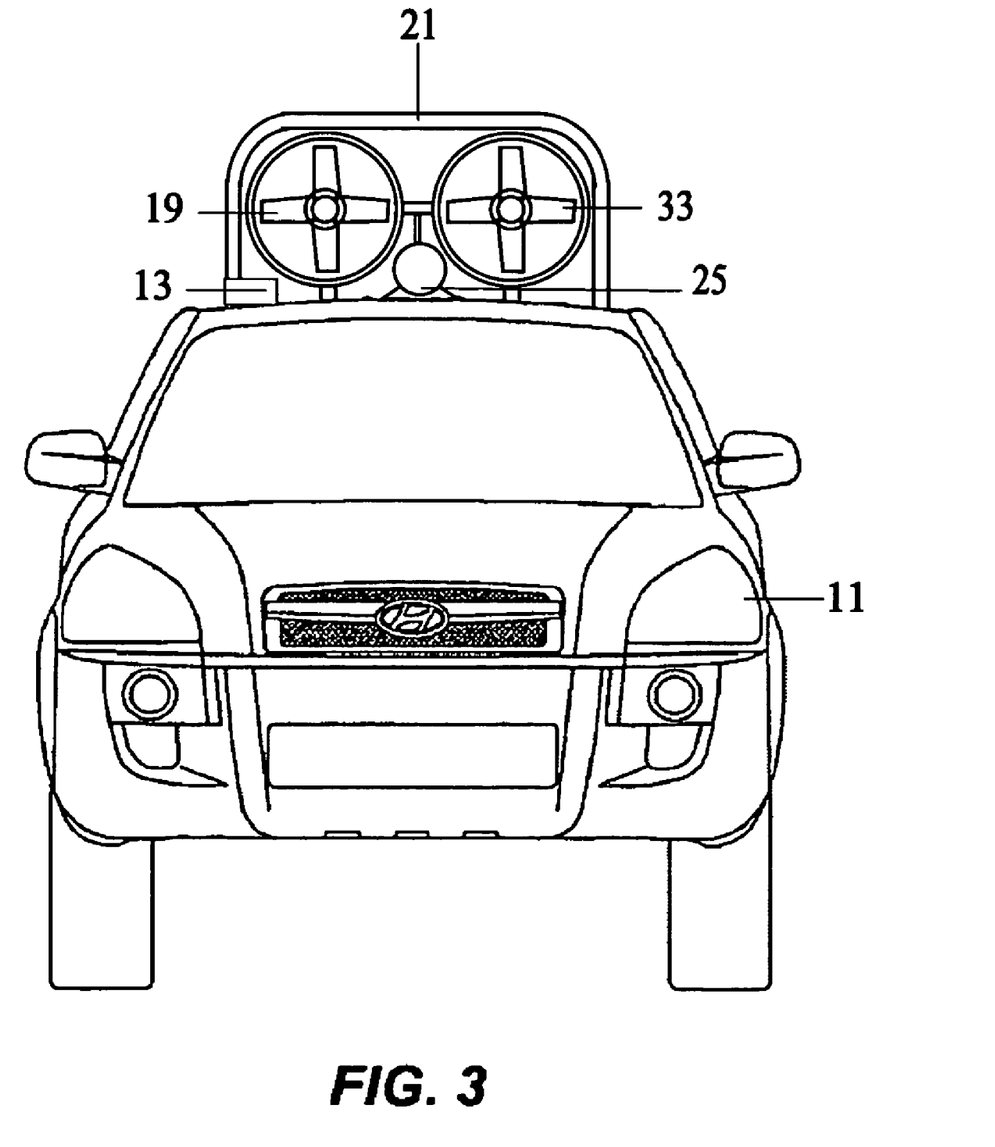
FIG. 3 is a front view of the present invention configuration illustrated in FIG. 2.

FIG. 3 is a front view of the present invention configuration described in FIG. 2 with the invention mounted to a small passenger vehicle 11. The aerodynamic housing 23 has been removed to provide an improved view of the spatial relationship of internal components. Gate control means 13 and electrical generator 25 are positioned relative to the wind turbines 19 and 33 such that they do not block incoming wind from striking the wind turbine blades 19 and 33. Wind turbines 19 and 33 are kept in a vertical plane relative to the roof of vehicle 11 by the support structure 21, which is designed to effectively support the turbines 19 and 33 without blocking the passage of wind through the housing 23, not shown in FIG. 3. While this support structure 21 keeps the wind turbines in a fixed orientation in the present figure, it is to be understood that rotatable support structures may be employed for self orienting wind turbines. One possible way to accomplish this is the use of a frame as shown, with supports around the perimeter of the wind turbines and additional vertical supports at their bases.

Figure 4:
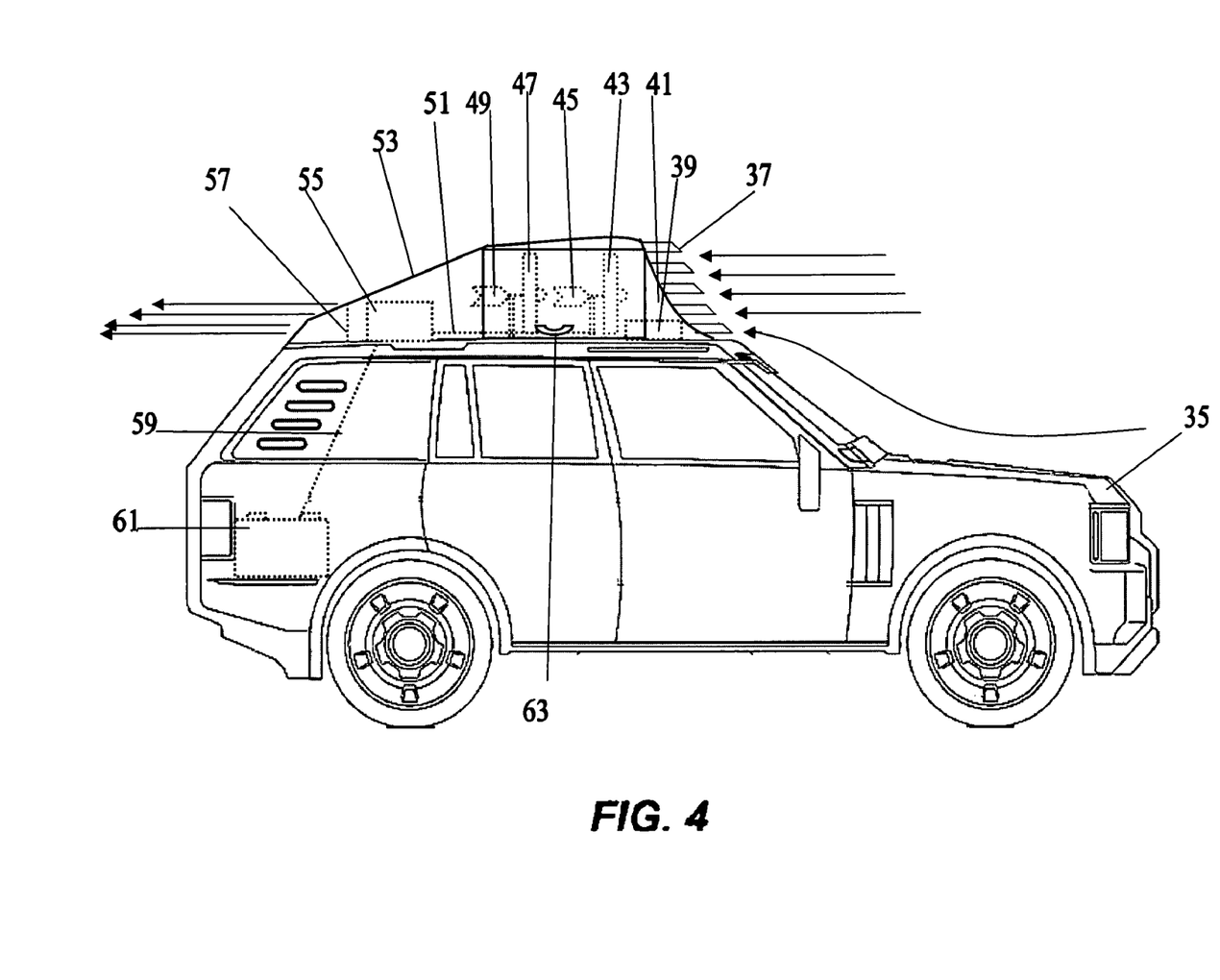
FIG. 4 is a second configuration of the present invention, including a louvered gate means, an aerodynamic housing with inlet and exhaust openings, moveable side partitions on the housing, and an array of wind tracking horizontal axis wind turbines.

FIG. 4 is a side view of the present invention with aerodynamic housing 53 mounted on the roof of a larger passenger vehicle 35. Gate control mean 39 detects when the vehicle 35 is decelerating or stationary and opens louvered gate 37. With gate 37 open, wind is allowed through the inlet 31 of aerodynamic housing 53. The wind then strikes wind turbines 43 and 47. Since vehicle 35 is a large passenger vehicle, more space is available on the roof of said vehicle, allowing a greater number of wind turbines to be used.

In the configuration of the present invention shown in FIG. 4, the wind turbines 43 and 47 are shown to be horizontal axis wind turbines with wind tracking vanes 45 and 49, which allow the assembly to rotate to face incoming wind. This is essential for maximum power generation when vehicle 35 is parked with side door 63 open. When parked, side door 63 can be opened to allow cross winds to enter aerodynamic housing 53. When combined with self orienting wind turbines or VAWTs this allows the present invention to generate electricity no matter the vehicle's orientation to natural wind while parked. It should be understood by one familiar in the art that the door 63 may take a number of forms. Door 63 may lift and slide into aerodynamic housing 53, it may be detachable, or it may fold to expose the interior components to cross winds. Wind tracking vanes 45 and 49 are only required when horizontal axis wind turbines are selected for use in the current configuration. Vertical axis wind turbines, whether they have vertical blades, horizontal blades, Darrieus blades, or Savonius blades, do not need to be oriented directly at incoming wind to function, and therefore can also be selected for use within an aerodynamic housing that has open or removable sides.

Once incoming wind has induced rotation of wind turbines 43 and 47, the rotational motion is transmitted by connecting assembly 51 to generator 55. Connecting assembly 51 may make use of linkages, gear trains, pulley systems, or similar devices to transmit the rotational motion of the wind turbines 43 and 47 to generator 55. When driven by the transmitted motion, generator 55 produces electricity, which is conducted via wiring harness 59 to the vehicle's storage battery 61. Vehicle storage battery 61 may be the primary battery of vehicle 35 or an auxiliary battery system used to power accessory systems. Wind then exits the aerodynamic housing 53 by the rear exhaust vent 57, which is smaller in area than inlet 41 to take advantage of the Venturi Effect.

Figure 5:
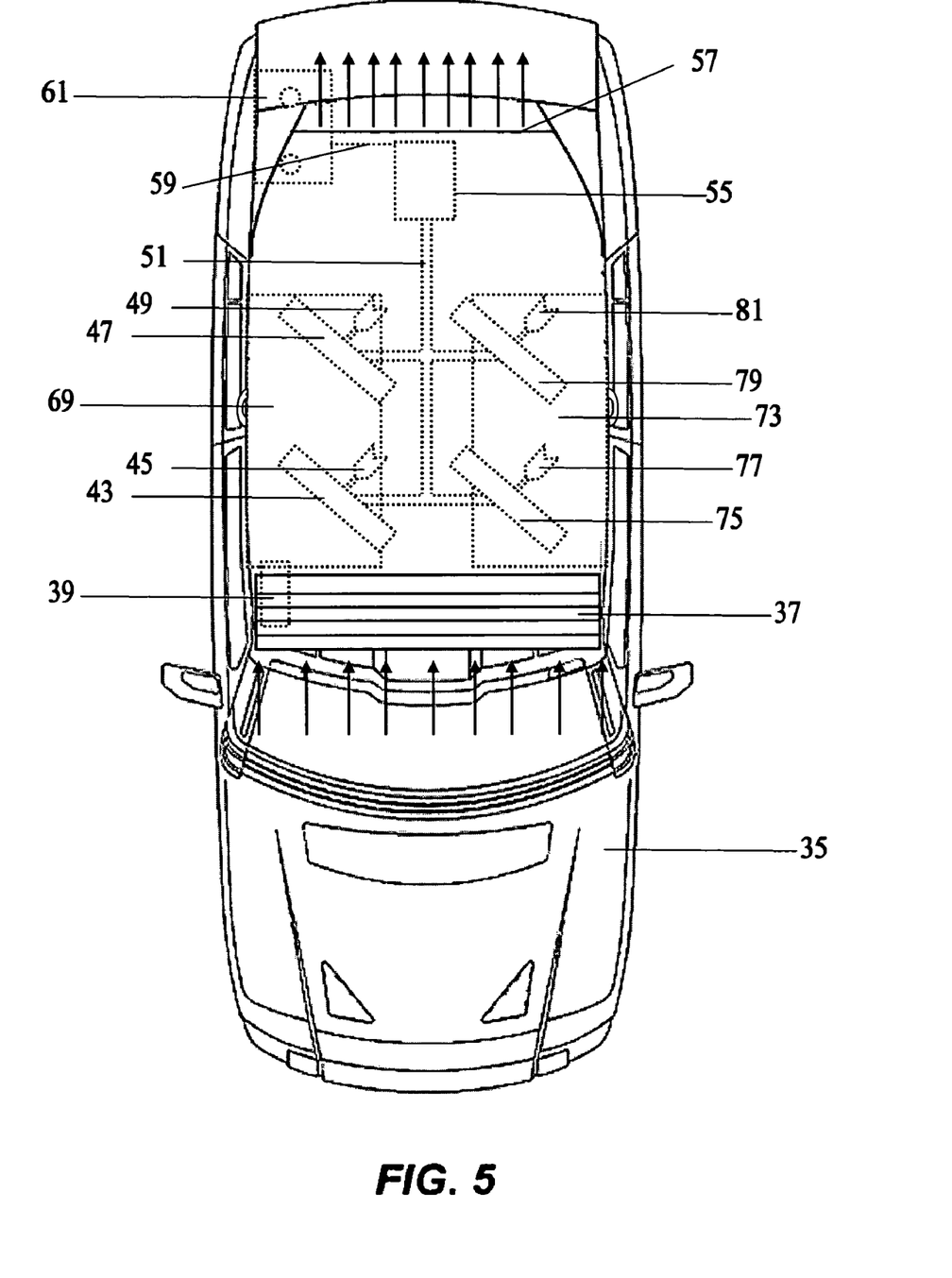
FIG. 5 is a top view of the present invention configuration illustrated in FIG. 4.

FIG. 5 illustrates a top view of the configuration of the present invention described in FIG. 4. The path of incoming wind through the system is the same as described above for FIG. 4. Gate control means 39 opens louvered gate 37 while the vehicle 35 is decelerating or stationary, and wind strikes wind turbines 43, 45, 75, 79 before exiting exhaust vent 57.

The tapering of the exhaust vent 57 to take advantage of the Venturi Effect is readily apparent in this view. Once the wind turbines 43, 45, 75, 79 are driven by incoming wind, the rotational motion is transmitted to generator 55 via connecting assembly 51. As previously described, connecting assembly 51 may make use of linkages, gear trains, pulley systems, or similar devices known to the art. When driven, generator 55 produces electricity which is conducted by wiring harness 59 to vehicle storage battery 61.

The view in FIG. 5 better depicts the use of increased roof space available on vehicle 35. A two-by-two array is formed by wind turbines 43, 47, 75, 79. Side doors 69 and 73 are shown in an open position and stored parallel to the roof of vehicle 35, allowing cross winds to enter from the sides of the vehicle. Wind tracking vanes 45, 49, 77, 81 swing wind turbines 43, 47, 75, 79 to face incoming wind. The spatial arrangement of turbines 43, 47, 75, 79 and attached vanes 45, 49, 77, 81 allows them to swing independent of each other without interfering with nearby components.

Figure 6:
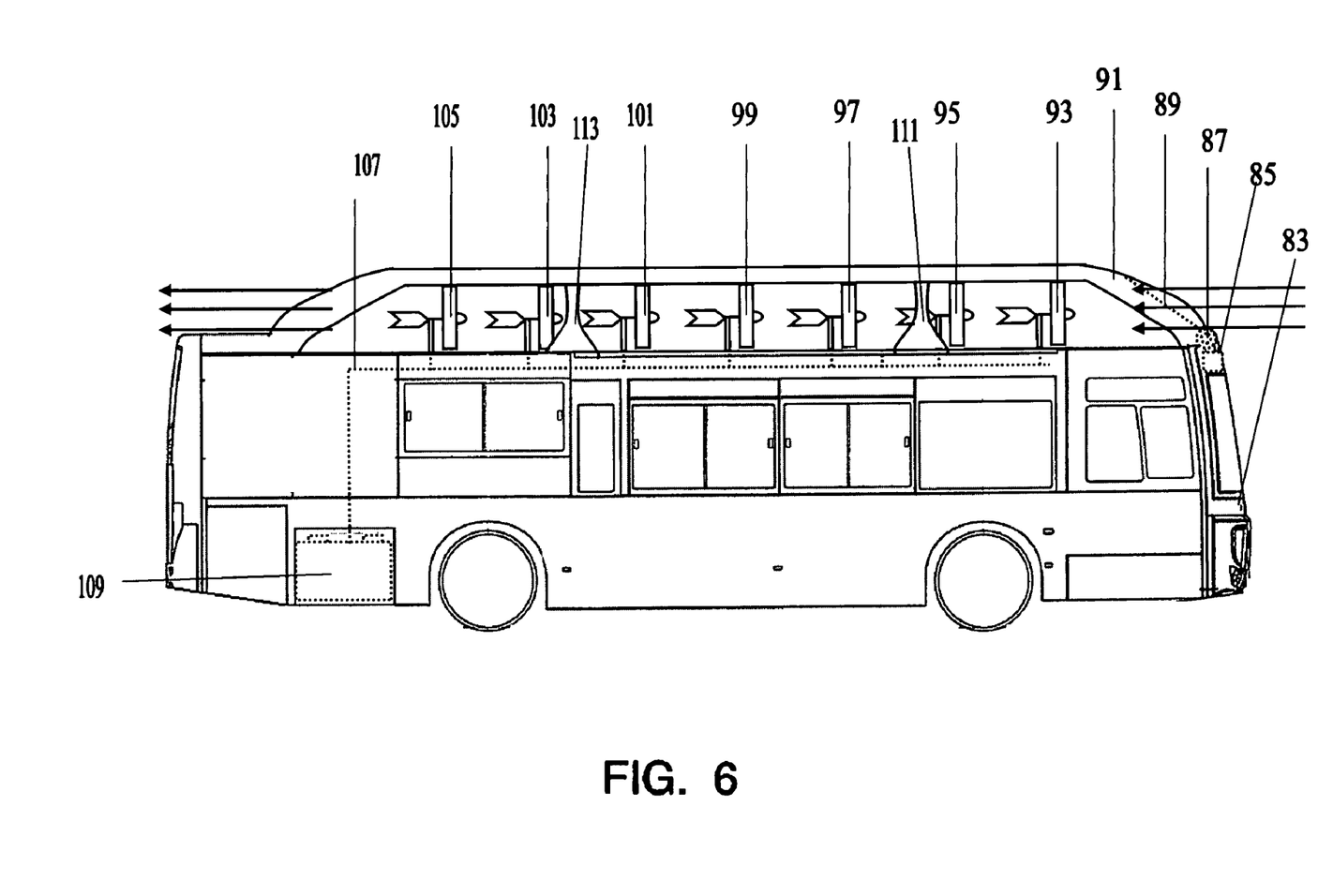
FIG. 6 is a third configuration of the present invention, including a single gate mechanism, an aerodynamic housing open on the sides and rear, and an array of wind tracking horizontal axis wind turbines.

FIG. 6 illustrates a configuration of the present invention adapted to large vehicles. Vehicle 83 is fitted with a roof mounted aerodynamic housing 91 which is open on three sides. Support structures 111 and 113 are used to reinforce the housing in the absence of solid sides. A single gate mechanism 89 is positioned at the front of the aerodynamic housing 91 and designed to rotate about hinge 87. Gate control means 85 opens gate 89 when it senses vehicle 83 is decelerating or stationary. This may be accomplished by measuring accelerometer changes, tachometer changes, brake or gas pedal changes, or engine control unit changes. Once gate 89 is open, wind is allowed to enter from the front of aerodynamic housing 91 and strike wind turbines 93, 95, 97, 99, 101, 103, 105 before exiting the aerodynamic housing 91.

It should be noted that no generator is shown in FIG. 6 as it is in preceding figures. This is due to the fact that the wind turbines 93, 95, 97, 99, 101, 103, 105 shown are peripheral power generating wind turbines. These units are designed to self orient to face incoming wind and produce electricity directly from the motion of the turbine blades. The rotor components of an electrical generator are mounted on the blades of the wind turbines 93, 95, 97, 99, 101, 103, 105 and pass through a stator housing that surrounds the perimeter of the blades. Whereas the wind turbines in previous figures generate rotational motion, peripheral power generating wind turbines 93, 95, 97, 99, 101, 103, 105 directly produce electricity, which can be conducted by wiring harness 107 to vehicle storage battery 109. In general, peripheral power generating wind turbines are capable of producing useable electricity at much lower wind speeds than most other turbine designs, making them ideal for use in low wind applications. The lack of additional components such as an external generator or transmission system greatly simplifies the wind turbine design and reduces the need for system maintenance.

Figure 7:
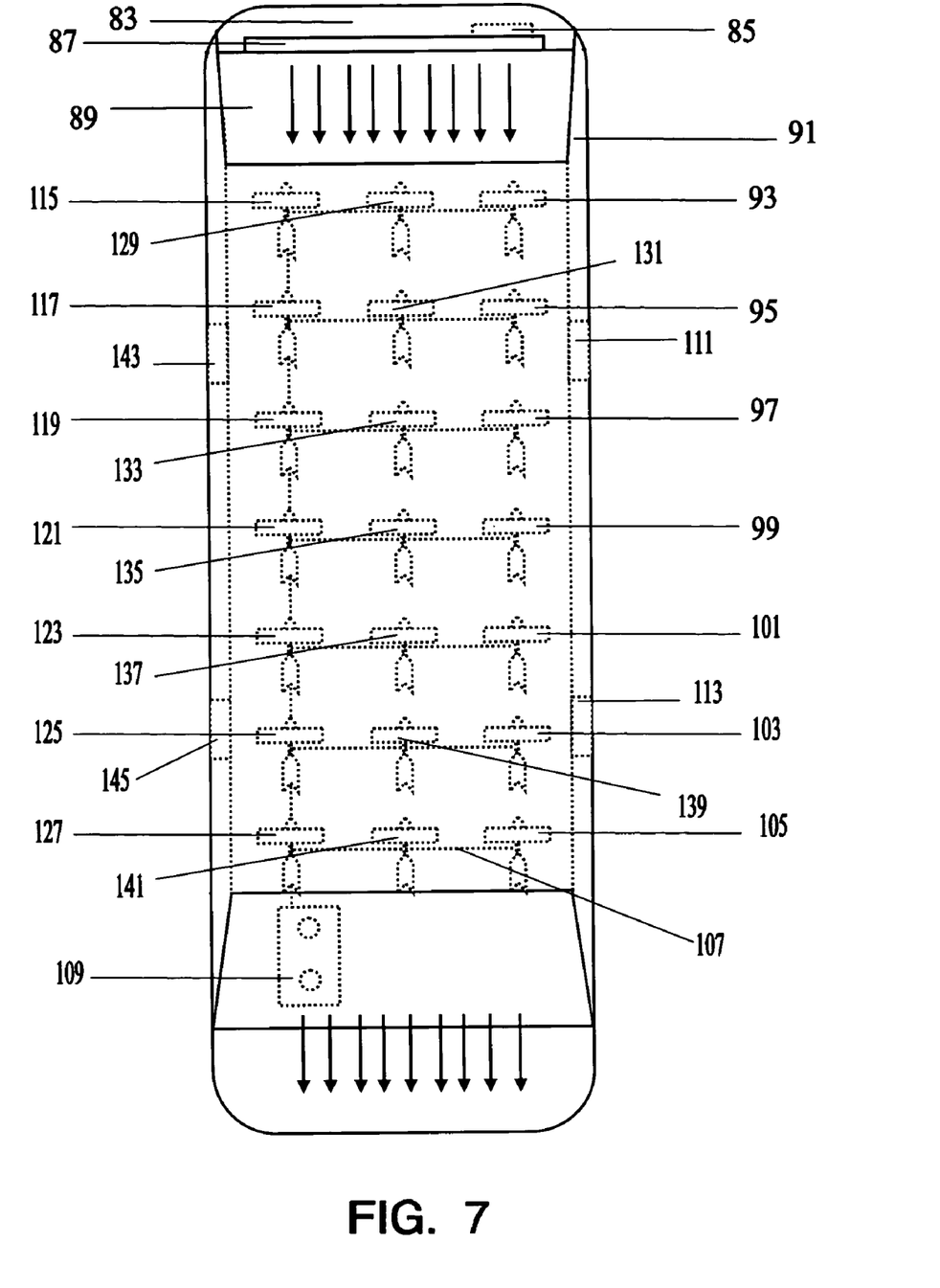
FIG. 7 is a top view of the present invention configuration illustrated in FIG. 6.

FIG. 7 illustrates a top view of the configuration of the present invention described in FIG. 6. Gate control means 85 is located within vehicle 83 and controls gate 89 about hinge 87, which are both visibly exposed from the vehicle 83 and aerodynamic housing 91 when viewed from above. With the greatly increased space afforded by the larger roof of vehicle 83, a larger array is formed by the self orienting wind turbines 93, 95, 97, 99, 101, 103, 105, 115, 117, 119, 121, 123, 125, 127, 129, 131, 133, 135, 137, 139, 141. Wiring harness 107 connects each individual wind turbine to the internally mounted vehicle storage battery 109. Support structures 111, 113, 143, 145 are arranged around the perimeter of housing 91 to help support the aerodynamic housing 91 in the absence of solid sides.

Figure 8:
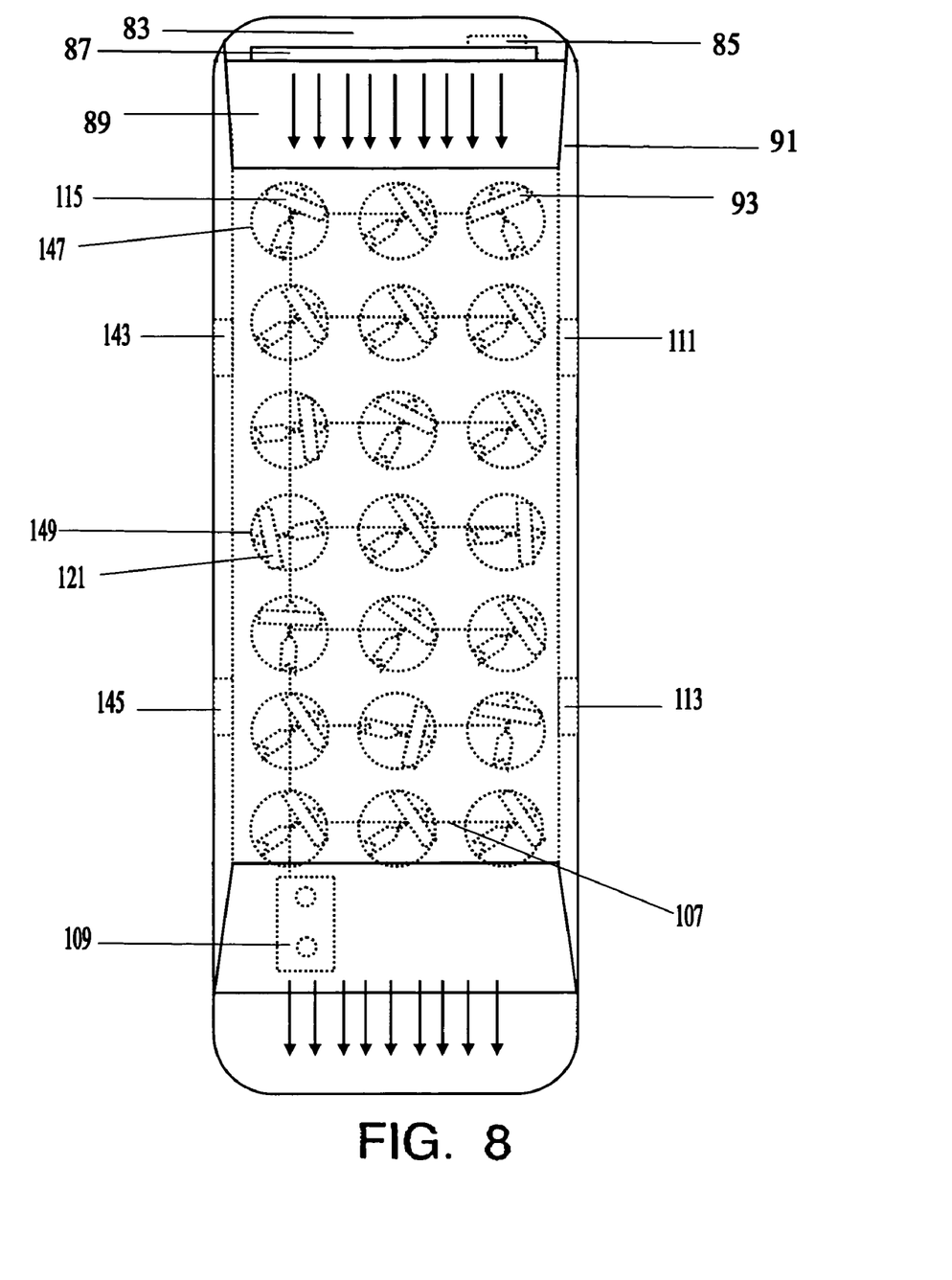
FIG. 8 is a second top view of the present invention configuration illustrated in FIG. 6 with the spatial arrangement of the wind tracking horizontal axis wind turbines outlined.

FIG. 8 depicts a second top view of the configuration described in FIG. 6 and FIG. 7. All components are the same as previously described for FIG. 6 and FIG. 7 with the exception of the circles inscribed about the peripheral power generating turbines. These circles represent the path traced by the outer most extremities of a peripheral power generating turbine as it rotates to face incoming wind. For example, as peripheral power generating turbines 115 and 149 rotate about their vertical axis, all parts of the turbines will fall within circles 147 and 149 respectively. The same holds true for every wind turbine pictured, regardless of orientation. Proper spacing of these prescribed paths on the roof of vehicle 83 permit room for the maximum number of wind turbines to be mounted while maintaining full range of motion for each individual wind turbine and access room for maintenance.

FIG. 8 also illustrates another feature of the present invention. As illustrated by wind turbines 115 and 121, each individual turbine is capable of rotation independent of the turbine array. This flexibility allows the device to respond to more local changes in wind direction caused by outside influences, such as turbulence from passing vehicles or obstructions to the flow or wind. This adaptability improves efficiency of the present invention during a wider range of operating conditions.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. An energy efficient land vehicle, including a conventional land vehicle having land power means, and having at least one storage battery and at least one power consuming mechanism directly or indirectly connected to said at least one storage battery, for controlled delivery of electric power to said at least one power consuming mechanism, the improvement comprising:

a supplemental electric power generation system located on said conventional land vehicle, said supplemental power plant including:
  i.) a housing;
  ii.) at least one set of rotatable blades mounted within said housing;
  iii.) a movable shaft connected to said at least one set of rotatable blades;
  iv.) a generator for generating electricity connected to said shaft;
  v.) a voltage regulator; and,
  vi.) a connection to said at least one storage battery for providing electric power thereto;
    wherein said housing has at least an open front for air ingress and an open area downstream from said blades for air egress, and said open front has at least one gate, said at least one gate having an open position allowing air to drive said at least one set of rotatable blades, and having a closed position preventing air to drive said at least one set of blades, and gate control means adapted to maintain said at least one gate in the open position when said vehicle is at rest and when said vehicle is moving during deceleration, and adapted to maintain said at least one gate closed when said vehicle is moving at a fixed speed and when said vehicle is moving during acceleration;
  such that when said vehicle is decelerating and said at least one gate is open, said rotatable blades are moved by wind speed created by movement of said land vehicle, said shaft rapidly rotated causing said generator to impart electricity through said voltage regulator, to said at least one storage battery, whereby said power consuming mechanism is indirectly powered by said generator so that electrical load on said storage battery is reduced.

2. The energy efficient land vehicle of claim 1 wherein said land power means is a combustion engine.

3. The energy efficient land vehicle of claim 1 wherein said land power means is an electric vehicle engine with storage batteries.

4. The energy efficient land vehicle of claim 1 wherein said land power means is a hybrid electric and combustion engine power means.

5. The energy efficient land vehicle of claim 1 wherein said at least one gate is at least one set of louvers.

6. The energy efficient land vehicle of claim 1 wherein said gate control means is arranged to respond to one criteria selected from the group consisting of gas pedal change, accelerometer change, tachometer change, brake pedal change, and ECU change.

7. The energy efficient land vehicle of claim 1 wherein said housing is attached to at least one part of said land vehicle selected from the group consisting of the roof, the side, the fender, the hood, and combinations thereof.

8. The energy efficient land vehicle of claim 1 wherein said blades and shaft constitute a wind turbine selected from the group consisting of a vertical axis-vertical blade wind turbine, a horizontal axis wind turbine, a Savonius wind turbine, a Darrieus wind turbine, and a vertical axis-horizontal blade wind turbine.

9. The energy efficient land vehicle of claim 1 wherein said rotatable blades and shaft constitute a wind turbine that is stationary in its orientation and facing forward.

10. The energy efficient land vehicle of claim 1 wherein said housing includes open sides and said blades and shaft include a directional vane to position said blades to face natural wind when said land vehicle is stationary.

11. An energy efficient land vehicle, including a conventional land vehicle having land power means, and having at least one storage battery and at least one power consuming mechanism directly or indirectly connected to said at least one storage battery, for controlled delivery of electric power to said at least one power consuming mechanism, the improvement comprising:
a supplemental electric power generation system located on said conventional land vehicle, said supplemental power plant including:
i.) a housing seamlessly integrated with said land vehicle;
ii.) at least one set of rotatable blades mounted within said housing;
iii.) a movable shaft connected to said at least one set of rotatable blades;
iv.) a generator for generating electricity connected to said shaft;
v.) a voltage regulator; and,
vi.) a connection to said at least one storage battery for providing electric power thereto;
wherein said housing has at least an open front for air ingress and an open area downstream from said blades for air egress, and said open front has at least one gate, said at least one gate having an open position allowing air to drive said at least one set of rotatable blades, and having a closed position preventing air to drive said at least one set of blades, and gate control means adapted to maintain said at least one gate in the open position when said vehicle is at rest and when said vehicle is moving during deceleration, and adapted to maintain said at least one gate closed when said vehicle is moving at a fixed speed and when said vehicle is moving during acceleration;
such that when said vehicle is decelerating and said at least one gate is open, said rotatable blades are moved by wind speed created by movement of said land vehicle, said shaft rapidly rotated causing said generator to impart electricity through said voltage regulator, to said at least one storage battery, whereby said power consuming mechanism is indirectly powered by said generator so that electrical load on said storage battery is reduced.

12. The energy efficient land vehicle of claim 11 wherein said land power means is a combustion engine.

13. The energy efficient land vehicle of claim 11 wherein said land power means is an electric vehicle engine with storage batteries.

14. The energy efficient land vehicle of claim 11 wherein said land power means is a hybrid electric and combustion engine power means.

15. The energy efficient land vehicle of claim 11 wherein said at least one gate is at least one set of louvers.

16. The energy efficient land vehicle of claim 11 wherein said gate control means is arranged to respond to one criteria selected from the group consisting of gas pedal change, accelerometer change, tachometer change, brake pedal change, and ECU change.

17. The energy efficient land vehicle of claim 11 wherein said housing is attached to at least one part of said land vehicle selected from the group consisting of the roof, the side, the fender, the hood, and combinations thereof.

18. The energy efficient land vehicle of claim 11 wherein said blades and shaft constitute a wind turbine selected from the group consisting of a vertical axis-vertical blade wind turbine, a horizontal axis wind turbine, a Savonius wind turbine, a vertical axis Darrieus wind turbine, and a vertical axis-horizontal blade wind turbine.

19. The energy efficient land vehicle of claim 11 wherein said rotatable blades and shaft constitute a wind turbine that is stationary in its orientation and facing forward.

20. The energy efficient land vehicle of claim 11 wherein said housing includes open sides and said blades and shaft include a directional vane to position said blades to face natural wind when said land vehicle is stationary.

* * * * *